Figure 4:
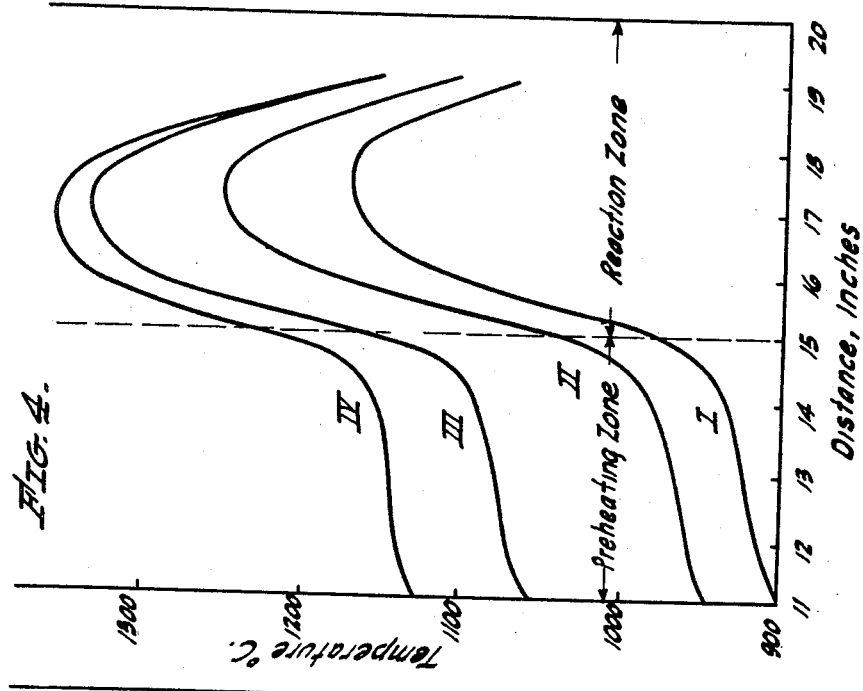

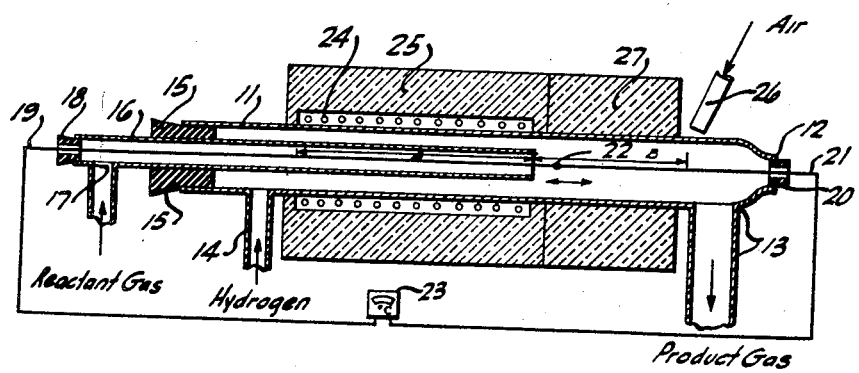

May 25, 1954

J. L. BILLS 2,679,544

MANUFACTURE OF ACETYLENE AND MIXTURES
OF ACETYLENE AND HYDROGEN CYANIDE

Filed Aug. 7, 1951

3 Sheets-Sheet 2

INVENTOR.
JOHN L. BILLS,
BY
Richard C. Newton
ATTORNEY.

May 25, 1954

J. L. BILLS 2,679,544

MANUFACTURE OF ACETYLENE AND MIXTURES
OF ACETYLENE AND HYDROGEN CYANIDE

Filed Aug. 7, 1951

3 Sheets-Sheet 3

INVENTOR.
JOHN L. BILLS,
BY
Richard C. Newton
ATTORNEY.

Patented May 25, 1954

2,679,544

UNITED STATES PATENT OFFICE 2,679,544

MANUFACTURE OF ACETYLENE AND MIXTURES OF ACETYLENE AND HYDROGEN CYANIDE

John L. Bills, Long Beach, Calif., assignor to Union Oil Company of California, Los Angeles, Calif., a corporation of California Application August 7, 1951, Serial No. 240,728

21 Claims. (Cl. 260—679)

This invention relates to the manufacture of acetylene, and in particular concerns an improved process for obtaining acetylene by the partial oxidation of hydrocarbons. It also relates to a process whereby a mixture of hydrogen cyanide and acetylene is produced in a single operation carried out under conditions of high temperature and short reaction time.

It is known that acetylene may be obtained by the partial oxidation of hydrocarbons, particularly saturated aliphatic hydrocarbons such as methane, ethane, propane, natural gas, etc., with oxygen or an oxygen-containing gas such as air. Such oxidation, however, does not occur to any significant extent except at elevated temperatures which favor a variety of side reactions, and consequently the yields of acetylene realized have been far below theoretical. When air is employed as the oxidizing agent the yield of acetylene is even further reduced as a result of the diluent effect of the large quantity of inert nitrogen present in the air. Accordingly, the best yields of acetylene have been obtained by employing pure oxygen as the oxidizing agent, but even under such conditions the yield of acetylene has not amounted to more than about 40 per cent, based on the amount of hydrocarbon consumed in the reaction. Such low yield and the high cost of the pure oxygen required, particularly the latter, have rendered the process commercially impractical despite the availability of large quantities of suitable hydrocarbons in the form of natural gas, waste refinery gases, etc.

It is accordingly an object of the present invention to provide a process for the production of acetylene by the partial oxidation of hydrocarbons.

Another object is to provide a process whereby acetylene may be produced from hydrocarbons in yields higher than those attained heretofore.

A further object is to provide a process whereby hydrocarbons, particularly normally gaseous saturated aliphatic hydrocarbons, are caused to react with air to form acetylene in yields as good as or better than those heretofore realized in processes employing pure oxygen as the oxidizing agent.

A further object is to provide a satisfactory method for the simultaneous production of hydrogen cyanide and acetylene.

A still further object is to provide a satisfactory method for producing a mixture of hydrogen cyanide and acetylene by reaction between certain hydrocarbons, oxygen and ammonia.

Other objects will be apparent from the following detailed description of the invention, and various advantages not specifically referred to herein will occur to those skilled in the art upon employment of the invention in practice.

I have now found that the above and related objects may be realized in a process based on the discovery that a highly exothermic reaction between hydrocarbons and oxygen to form acetylene may be induced by admixing hydrogen with a suitably preheated reactant gas mixture comprising the hydrocarbon and oxygen, and that by limiting the period of time over which such reaction is allowed to take place, the acetylene product may be obtained in relatively high yield. More particularly, I have found that when hydrogen is admixed with a preheated reactant gas mixture essentially comprising a hydrocarbon and oxygen, a reaction occurs accompanied by a very rapid increase in the temperature of the mixture. The temperature ultimately attained in the mixture is herein referred to as the "reaction temperature," and varies directly with the temperature of the reactant gas at the time it is admixed with the hydrogen. The latter temperature is herein referred to as the "preheat temperature." Accordingly, the reaction temperature may be controlled by varying the preheat temperature. By so controlling the reaction temperature to values between about 1100° C. and about 1500° C., and by limiting the period of time over which the gas mixture is permitted to remain at temperatures within such range to between about 0.001 and about 0.05 second and thereafter immediately cooling the gas mixture to a temperature at which substantially no further reaction takes place, e. g., to about 650° C. or lower, acetylene may be obtained in yields of 50 per cent or higher, based on the amount of hydrocarbon consumed. I have also found that the hydrogen which is admixed with the preheated reactant gas mixture comprising a hydrocarbon and oxygen may advantageously be employed in admixture with certain other gases.

The invention thus consists in the process for the production of acetylene which comprises (1) mixing hydrogen, alone or in admixture with certain other gases, with a reactant gas essentially comprising a hydrocarbon, preferably a normally gaseous saturated aliphatic hydrocarbon, and oxygen at a temperature such that the temperature attained in the reaction which is induced by said mixing is between about 1100° C. and about 1500° C.; (2) allowing such reaction to take place for from about 0.001 to about 0.05 second; and (3) thereafter immediately cooling the product gas to a temperature at which substantially no further reaction occurs. When it is desired to produce the acetylene in admixture with hydrogen cyanide, ammonia is included in the reactant gas as is hereinafter more fully explained. Such process is conveniently carried out by passing the hydrocarbon and reactant gas comprising the hydrocarbon and oxygen through a preheating zone and thence into a reaction zone wherein the preheated reactant gas is admixed with hydrogen and wherein the aforesaid reaction occurs, the temperature attained by the reactant gas in the preheating zone, i. e., the preheat temperature, being such that a reaction temperature of between about 1100° C. and about 1500° C. is attained in the reaction zone upon the admixing of the hydrogen with the preheated reactant gas, and withdrawing the resulting product gas from the reaction zone and cooling it to a temperature at which substantially no further reaction occurs within from about 0.001 and about 0.05 second after the admixture of the hydrogen with the preheated reactant gas. By employing such procedure, acetylene may be produced from hydrocarbons and air in yields considerably higher than those realized in previous processes which have required the use of pure oxygen. The formation of free carbon is substantially eliminated, and the amount of carbon dioxide formed by side reactions is greatly reduced. Furthermore, the reaction induced by the addition of the hydrogen to the preheated reactant gas is more highly exothermic than that involved in the previously known processes, and accordingly the heat requirements of the present process are lower. Substantially the only heat consumed is that required to preheat the reactant gas and the hydrogen. Other advantages of the present process lie in the simplicity of the equipment required and in its adaptability to the application of various economical engineering techniques.

I am aware that it has been proposed to admix hydrogen with a reactant gas mixture comprising a hydrocarbon and oxygen prior to the passage of such mixture through a high temperature reaction zone for the production of acetylene, but I have found that the yields of acetylene realized by such procedure are considerably lower than those attained by adding hydrogen to the reactant gas mixture after the latter has been suitably preheated. Similarly, the present process differs from the proposal to produce acetylene by passing a hydrocarbon through a high temperature flame such as is produced by the combustion of hydrogen in that an entirely different type of reaction is involved, namely oxidation rather than pyrolytic cracking, and in that the hydrogen is not consumed by combustion to form a flame but may be recovered from the product gas and recycled for re-use in the process.

Figure 3:
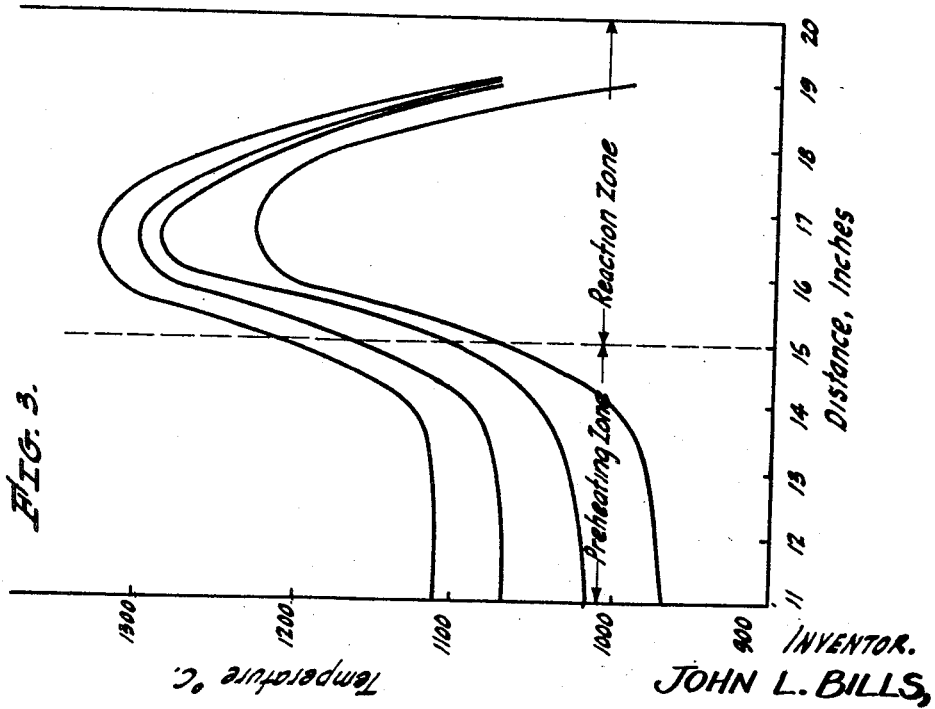
Figure 5:
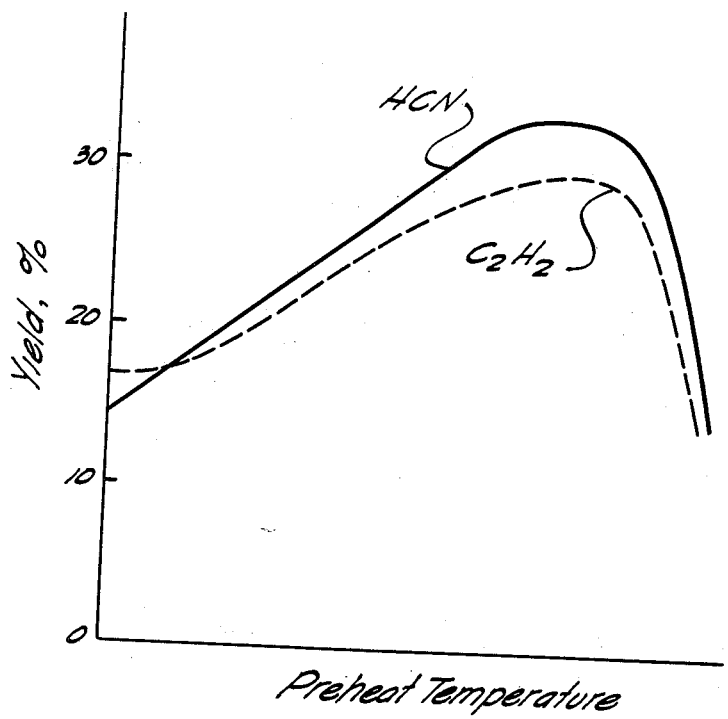

The nature of the invention may readily be understood by reference to the accompanying drawings which form a part of this specification. In said drawings, Figure 1 diagrammatically represents a longitudinal cross-section of a simple apparatus which has been employed experimentally to demonstrate the nature of the invention. Figure 2 represents a longitudinal cross-section of a somewhat different form of reactor adapted for larger-scale operation. Figure 3 illustrates the relationship that exists between the preheat temperature and the reaction temperature at various points along the length of the reaction zone, and demonstrates the fact that the reaction between the hydrocarbon and oxygen is initiated at the point of the addition of the hydrogen. Figure 4 illustrates the same relationship as it exists when a mixture of hydrogen and nitrogen is employed instead of pure hydrogen. Figure 5 relates to the simultaneous production of acetylene and hydrogen cyanide according to one embodiment of the invention, and illustrates the relationship between the yields of hydrogen cyanide and acetylene and the preheat temperature.

Referring now to Figure 1, the illustrated apparatus consists of a quartz tube 11 one end of which is constricted to form a relatively small opening 12. A relatively large diameter side-arm 13 is positioned near the constricted end of tube 11, and serves as an exit conduit for the product gas. A relatively small diameter side-arm 14 is positioned near the opposite end of tube 11, and serves as a hydrogen inlet conduit. The open end of tube 11 is fitted with a stopper 15 which closes tube 11 and coaxially supports tube 16 which extends within tube 11 for a portion of its length. Side-arm 17 is positioned near the exterior end of tube 16, and serves as an inlet conduit for the reactant gas. The exterior end of tube 16 is closed by stopper 18 through which passes a platinum thermocouple lead 19. Similarly, opening 12 of tube 11 is closed by stopper 20 through which passes a platinum-iridium thermocouple lead 21. Thermocouple leads 19 and 21 are joined within tube 11 to form thermocouple junction 22, and are connected exteriorly to pyrometer 23 which indicates the temperature of thermocouple junction 22. Thermocouple leads 19 and 21 are capable of horizontal motion through stoppers 18 and 20, respectively, and accordingly the thermocouple junction 22 may be positioned at any desired point along the axis of tubes 11 and 16 and the temperature at that point will be indicated by pyrometer 23. A portion of the length of tube 11 is surrounded by an electric heating element 24, which in turn is surrounded by insulation 25 provided to minimize heat losses to the atmosphere. The length of heating element 24 defines preheating zone A within tube 16, and within tube 11 reaction zone B extends from the end of tube 16 to the point where the gas mixture passing through tube 11 is cooled to a temperature at which no further reaction occurs. The latter is accomplished by directing a current of air from conduit 26 against the outside of tube 11 as shown. Reaction zone B is surrounded by insulation 27 which serves to minimize heat losses to the atmosphere, and product gas exit 13 leads to conventional means, not shown, for collecting and sampling the product gas. This apparatus operates as follows: The reactant gas, consisting of a suitable mixture of a hydrocarbon and oxygen or air is introduced into tube 16 through reactant gas inlet 17 as shown. As the reactant gas passes through preheating zone A within tube 16 it becomes heated to the desired preheat temperature by heating element 24 which is controlled to produce such temperature in the reactant gas issuing from the open end of tube 16 within tube 11. The hydrogen is introduced into tube 11 through hydrogen inlet 14, and likewise becomes heated to the preheat temperature as it passes through the annular space between tubes 11 and 16 adjacent to heating element 24. At the open end of tube 16 within tube 11, i. e., at the end of the preheating zone, the hydrogen mixes with the preheated reactant gas and reaction occurs with the formation of acetylene as the gas mixture passes through reaction zone B. At the end of reaction zone B the gas mixture is immediately cooled to a temperature at which substantially no further reaction occurs, and the cooled product gas is withdrawn through product gas outlet 13 and passed to conventional gas storage and sampling apparatus. It will be noted that in this apparatus the only heat supplied to the reaction zone is that contained in the preheated reactant gas and hydrogen. The exothermic heat of reaction is sufficient to make up for heat losses to the atmosphere and sustain the reaction. It will also be noted that the length of reaction zone B may be varied by sliding tube 16 in or out of stopper 15, so that the time required for the gas mixture to pass through the reaction zone may be varied at will without changing the rate of feed. As previously explained, the temperature at any point along the length of either the preheating zone A or reaction zone B may be determined by positioning thermocouple junction 22 at the desired point.

The following examples illustrate various experiments carried out with the apparatus of Figure 1 to demonstrate the principle upon which the invention is based, but are not to be construed as limiting the invention.

*Example I*

The apparatus was constructed substantially as shown in Figure 1, tubes 11 and 16 having inside diameters of about ¼ and about ⅛ inch, respectively. Tube 16 extended within tube 11 to such an extent that preheating zone A and reaction zone B were 15 inches and 5 inches in length, respectively. Preheating was supplied by two "Glo-Bar" silicon carbide heating elements which extended along the 15-inch preheating zone, and which could be controlled to heat the reactant gas and hydrogen to pre-selected preheat temperatures. Four experiments were carried out under the following conditions:

Reactant gas:
  Natural gas _____ 23.1% by vol.
  Air _____ 76.9% by vol.
Rate of feed, reactant gas _____ 8.65 s. c. f./hr.
Rate of feed, hydrogen _____ 4.6 s. c. f./hr.
Vol. ratio, hydrogen/reactant gas 0.53/1.
Residence time within reaction zone. 0.008 sec.

The natural gas employed had the following composition:

| | Percent by volume |
|---|---|
| Methane | 89.5 |
| Ethane | 6.3 |
| Carbon dioxide | 0.8 |
| Propane | 3.4 |
| | 100.0 |

In each experiment, the heating element was set to provide a pre-selected preheat temperature, and the reactant gas and hydrogen were introduced into their respective inlets at the rates specified above. The product gas withdrawn from the reaction zone was passed through a cold trap to condense out the water, and was then passed to a conventional gas sampling system. After steady-state conditions had been attained, the temperature at various points along the length of the preheating and reaction zones was determined by means of the movable thermocouple. The yield of acetylene was determined by analysis of the product gas. The data obtained are tabulated as follows:

| Experiment | Selected Preheat Temp., °C. | Temperature, °C., at Points Along Length of Tube 11, Inches from Beginning of Preheating Zone | | | | | | | | | Yield of Acetylene,[1] Percent |
|---|---|---|---|---|---|---|---|---|---|---|---|
| | | 11 | 12 | 13 | 14 | 15 | 16 | 17 | 18 | 19 | |
| 1 | 1,120 | 1,110 | 1,110 | 1,110 | 1,126 | 1,202 | 1,316 | 1,320 | 1,253 | 1,100 | 52.0 |
| 2 | 1,075 | 1,066 | 1,066 | 1,070 | 1,083 | 1,164 | 1,282 | 1,290 | 1,236 | 1,048 | 51.2 |
| 3 | 1,035 | 1,017 | 1,017 | 1,030 | 1,036 | 1,104 | 1,253 | 1,278 | 1,228 | 1,057 | 49.6 |
| 4 | 975 | 968 | 972 | 978 | 988 | 1,074 | 1,205 | 1,223 | 1,178 | 1,008 | 47.6 |

[1] Based on amount of natural gas consumed.

These data are presented graphically in Figure 3. It will be noted that the addition of the hydrogen to the preheated reactant gas effects a very rapid increase in temperature along the length of the reaction zone, and that the maximum temperature attained within the reaction zone varies directly with the preheat temperature. This increase in temperature is the result of an exothermic reaction occurring upon admixture of the hydrogen with the preheated reactant gas. The fact that the selected preheat temperature was attained in the reactant gas stream at a point prior to its entrance into the reaction zone, i. e., the reactant gas was introduced into the reaction zone at a temperature somewhat higher than that which had been pre-selected as the preheat temperature, is attributable to the conduction of heat from the reaction zone back into the preheating zone along the walls of the reactor and through the thermocouple leads.

*Example II*

The apparatus and procedure employed were the same as in Example I. Reaction conditions were as follows:

Reactant gas:
  Natural gas _____ 23.1% by vol.
  Air _____ 76.9% by vol.
Rate of feed, reactant gas _____ 8.65 s. c. f./hr.
Rate of feed, hydrogen _____ 4.6 s. c. f./hr.
Vol. ratio, hydrogen/reactant gas 0.53/1.
Residence time within reaction zone. 0.008.
Preheat temperature _____ 1100° C.
Reaction temperature, max. _____ 1290° C.

The product gas obtained contained (water-free basis):

| | Percent by volume |
|---|---|
| Acetylene | 3.6 |
| Methane | 5.0 |
| Ethylene | 0.4 |
| Carbon monoxide | 5.7 |
| Carbon dioxide | 0.5 |
| Nitrogen | 42.8 |
| Hydrogen | 42.0 |
| | 100.0 |

Material balances were as follows:

| | Per cent |
|---|---|
| Natural gas converted to acetylene | 37.8 |
| Natural gas converted to carbon monoxide | 29.8 |
| Natural gas converted to other products | 6.2 |
| Natural gas unconverted | 26.2 |
| Yield of acetylene, based on natural gas supplied | 37.8 |
| Yield of acetylene, based on natural gas consumed | 51.2 |
| Yield of carbon monoxide, based on natural gas supplied | 29.8 |
| Yield of hydrogen, based on natural gas supplied | 15.0 |

Example III

In order to demonstrate that the improved yield of acetylene secured by the present process is due to some chemical action of the added hydrogen rather than to some physical effect of an added gas regardless of its chemical identity, two experiments were carried out under the following conditions:

| | |
|---|---|
| Reactant gas: | |
| Methane | 24.6% by vol. |
| Air | 75.4% by vol. |
| Rate of feed, reactant gas | 8.15 s. c. f./hr. |
| Rate of feed, added gas | 6.0 s. c. f./hr. |
| Vol. ratio, added gas/reactant gas | 0.74/1. |
| Preheat temperature | 1150° C. |
| Residence time within reaction zone | 0.008 sec. |

The procedure and apparatus employed were the same as those of the preceding examples. In the first experiment, in which hydrogen was employed as the added gas, the yield of acetylene was 44.1 per cent, based on the methane consumed. In the second experiment, in which nitrogen was substituted for the added hydrogen, the yield of acetylene was only 30.2 per cent, based on the amount of methane consumed. By way of comparison, the yield of acetylene obtained when the reactant gas was passed directly through the reactor without the addition of any gas to the reaction zone was 31.4 per cent, based on the amount of methane consumed.

Example IV

In order to demonstrate the use of hydrocarbons other than methane and natural gas in the present process, five experiments were carried out employing ethylene, propane, kerosene, light petroleum naphtha, and cyclohexane, respectively, as the hydrocarbon reactant. The kerosene had a specific gravity of about 0.811 and a boiling range of 348° to 523° F. The petroleum naphtha had a specific gravity of about 0.633 and a boiling range of 83° to 100° F. The conditions under which these experiments were carried out and the results obtained are set forth in the following table:

Considering now the essential operating variables in somewhat greater detail, the reactant gas consists essentially of a proportioned mixture of a hydrocarbon and oxygen. A wide variety of hydrocarbons are suitable, but best results are obtained with non-aromatic hydrocarbons, particularly those which are normally gaseous or liquid and boil below about 400° C. under atmospheric pressure. The term "non-aromatic hydrocarbon" is herein employed as a generic term including saturated and unsaturated aliphatic and cycloaliphatic hydrocarbons but excluding aromatic or benzenoid hydrocarbons. The normally gaseous saturated aliphatic hydrocarbons, particularly methane and natural gas, are especially preferred by reason of their low cost and ease of handling. Hydrocarbon mixtures, e. g., mixed refinery gases and various petroleum distillates, are also suitable. When employing a liquid hydrocarbon reactant, exterior means are provided for vaporizing the same prior to its admixture with the oxygen and/or prior to its introduction into the preheating zone, or such vaporization is effected within the preheating zone itself. The oxygen reactant is pure oxygen itself, oxygen-enriched air, ordinary air, or any other gas containing free oxygen. As previously stated, air is preferred by reason of its lack of cost, and it is one of the features of the present process that the results obtained employing air are comparable or better than those of previous processes in which pure oxygen was employed. The mole ratio of hydrocarbon to oxygen in the reactant gas varies between rather wide limits, depending upon the identity of the hydrocarbon. When the hydrocarbon is one of relatively high molecular weight, e. g., a petroleum distillate such as kerosene, as many as 50 moles of oxygen should be provided per mole of hydrocarbon. On the other hand, when the hydrocarbon is one of low molecular weight, e. g., methane, an excess of the hydrocarbon is employed so that the mole ratio of hydrocarbon to oxygen is suitably between about 1.33/1 and about 2.0/1. Thus, the mole ratio of hydrocarbon to oxygen varies from 0.02/1 to 2.0/1 depending upon the nature of the hydrocarbon. When the oxygen reactant is provided in the form of air and the hydrocarbon is natural gas, the reactant gas may comprise from about 17 to about 30 per cent by volume of natural gas and, correspondingly, from about 83 to about 70 per cent by volume of air. When the reactant gas comprises air and a petroleum distillate such as kerosene, it may contain from about 4 to about 10 per cent by volume of the hydrocarbon and from about 96 to about 90 per cent by volume of air.

The amount of hydrogen which is admixed with the reactant gas within the reaction zone may be varied considerably. Usually, however, from

| Experiment No. | 1 | 2 | 3 | 4 | 5 |
|---|---|---|---|---|---|
| Hydrocarbon | Ethylene | Propane | Kerosene | Naphtha | Cyclohexane |
| Reactant Gas, percent by vol.: | | | | | |
| Hydrocarbon | 24.2 | 12.6 | 4.25 | 5.72 | 8.25 |
| Air | 75.8 | 87.4 | 96.75 | 94.28 | 91.75 |
| Rate of Reactant Gas Feed, s. c. f./hr | 16.55 | 14.25 | 16.45 | 16.72 | 17.20 |
| Rate of Hydrogen Feed, s. c. f./hr | 9.2 | 4.0 | 4.0 | 4.0 | 4.0 |
| Preheat Temperature, ° C | 1,150 | 1,160 | 1,100 | 1,070 | 1,105 |
| Reaction Temperature, max., ° C | 1,190 | 1,320 | 1,250 | 1,275 | 1,245 |
| Preheat Time, sec | 0.007 | 0.01 | 0.01 | 0.01 | 0.01 |
| Reaction Time, sec | 0.03 | 0.02 | 0.02 | 0.02 | 0.02 |
| Acetylene in Product Gas, percent by vol | 4.5 | 4.1 | 4.6 | 3.4 | 5.0 |
| Yield of Acetylene, based on hydrocarbon supplied | 29.8 | 30.4 | 26.4 | 21.9 | 28.1 |
| Yield of Acetylene, based on hydrocarbon consumed | 36.6 | 30.4 | 26.4 | 21.9 | 28.1 | about 0.5 to about 5 moles, preferably from about 1.5 to about 3 moles, of hydrogen are provided per mole of hydrocarbon in the reactant gas. Such added hydrogen is preferably, but not necessarily, preheated prior to its introduction into the reaction zone. In the reactors shown in Figures 1 and 2 such preheating is inherently provided by the design of the apparatus. However, independent means for preheating the hydrogen may be employed if desired.

The temperature to which the reactant gas is preheated prior to its introduction into the reaction zone and admixture therein with the hydrogen is such that the temperature attained in the reaction which is induced by said admixing is between about 1100° C. and about 1500° C., preferably between about 1275° C. and about 1375° C. The preheat temperature necessary to attain a reaction temperature within this range depends upon a number of factors, including the composition of the reactant gas, and the residence time within the preheating zone. All of these variables are factors which contribute to the possibility of reaction occurring between the reactant gas components during the preheating and in the absence of the added hydrogen. Inasmuch as it is desirable to avoid such reaction these variables should be so controlled so that the preheat temperature is sufficient to attain the desired subsequent reaction temperature but is not so high that reaction between the components of the reactant gas takes place to any substantial extent during the preheating. Accordingly, with the reactant gas mixtures of the composition previously given it is usually desirable to preheat as rapidly as possible, e. g., in from about 0.005 to about 0.5 second. Thus, it is usually preferred to combine the components of the reactant gas prior to preheating the same, and to pass the mixture through the preheating zone at a relatively high rate of flow. However, certain engineering advantages lie in separately preheating the components of the reactant gas, and if desired such may be effected although the preheated components should be mixed prior to their admixture with the hydrogen within the reaction zone. Under ordinary conditions of operation the preheat temperature will be between about 600° C. and about 1150° C. with a preheat time between about 0.1 and about 0.005 second. When air is employed as the source of oxygen the preheat temperature will usually be in the upper end of this range, e. g., from about 950° C. to about 1150° C. When pure oxygen is employed the preheat temperature will be somewhat lower; e. g., 600°–1000° C.

The reaction time, i. e., the time interval between admixture of the reactant gas with the hydrogen and the cooling of the product gas to a relatively low temperature, and the reaction temperature are more or less interdependent, shorter reaction times being employed at higher temperatures and vice versa. Usually such time is between about 0.001 and about 0.05 second, preferably between about 0.002 and about 0.02 second, and is readily controlled by varying the rate at which the reactant gas and hydrogen are introduced into, and the product gas withdrawn from, the reaction zone.

Various types of apparatus may be employed in practicing the process of the invention. However, it has been found that best results are secured when the reactor is of such design as to promote non-turbulent mixing of the reactant gas and hydrogen mixtures in the reaction zone. Such reactor may provide for the addition of the hydrogen mixture to the reactant gas stream in a direction concurrent with the latter, as is accomplished in the apparatus of Figures 1 and 2. Alternatively, the stream of hydrogen and inert gas may be tangentially introduced into the reactant gas stream. Other means of securing non-turbulent mixing of gas streams are known in the art. As previously mentioned, it is also desirable that the flow of the preheated reactant gas prior to its introduction into the reaction zone be substantially unobstructed.

Figure 2 shows a reactor which is very similar in principle to that of Figure 1, but which is employed for larger-scale operations. Said reactor consists of a refractory tube 31 vertically disposed within furnace 32, which is constructed of fire-brick or other refractory material. The lower end of tube 31 coincides with an opening 33 in the floor of furnace 32, and thus communicates with quenching chamber 34 located directly below furnace 32. The upper end of tube 31 passes through the roof of furnace 32 and terminates outside the furnace in a fitting 35. Packing gland 36 serves to form a gas-tight connection between tube 31 and fitting 35. Fitting 35 supports reactant gas inlet 37 within tube 31, with packing gland 38 serving to form a gas-tight connection between reactant gas inlet 37 and fitting 35. Reactant gas inlet 37 extends within tube 31 for a portion of its length, and communicates with an exterior supply of the reactant gas, not shown. Fitting 35 also supports hydrogen inlet 39 which communicates between an exterior supply of hydrogen, not shown, and the annular space between tube 31 and reactant gas inlet 37. Burners 40a to 40f are positioned within furnace 32 so as to heat that part of tube 31 within which reactant gas inlet 37 extends, and are supplied with a combustible gas or liquid fuel from an exterior source, not shown. Stack 41 in the roof of furnace 32 provides an exit for the flue gas generated by the burners. Within cooling chamber 34 located beneath furnace 32, water sprays 42a to 42d are positioned so as to direct sprays of water into the gas stream issuing from opening 33 in the furnace floor. A gas outlet 43 is provided in the upper part of cooling chamber 34 for withdrawing the cooled product gas, and outlet 44 located near the bottom of the chamber serves for the withdrawal of water therefrom. Within the reactor, that part of reactant gas inlet 37 which extends within the furnace forms the reactant gas preheating zone wherein the reactant gas is preheated to the desired temperature by burners 40a to 40f. The hydrogen mixture is similarly preheated as it passes through the annular space between tube 31 and reactant gas inlet 37. As indicated, the reaction zone extends from the lower end of reactant gas inlet 37 within tube 31 where the reactant gas and hydrogen mixture come in contact with one another to the point within cooling chamber 34 where the hot gases are cooled by water sprays 42a to 42d.

Operation of this reactor is substantially the same as previously described. The reactant gas and hydrogen are introduced through their respective inlets and are preheated as they pass through tubes 37 and 31 opposite burners 40a to 40f. At the end of tube 37 within tube 31, the gases become admixed and reaction occurs to produce acetylene as the mixture passes through the reaction zone. Upon completion of the reaction the product gas is shock-cooled by water sprays 42a to 42d, and the cooled gas is withdrawn through outlet 43 and is passed to storage. A typical product gas obtained from a reactant gas comprising 25 per cent by volume of methane and 75 per cent by volume of air consists of:

| | Per cent by vol. |
|---|---|
| Acetylene | 3.8 |
| Methane | 4.7 |
| Ethylene | 0.4 |
| Carbon monoxide | 6.0 |
| Carbon dioxide | 0.4 |
| Nitrogen | 43.0 |
| Hydrogen | 41.6 |
| | 100.0 |

As has been previously mentioned, the hydrogen which is introduced into the reaction zone and therein admixed with the preheated reactant gas in accordance with the invention may be employed in admixture with certain other gases. Any inert gas, i. e., any gas which does not react with the other components of the system under the conditions prevailing in the reaction zone, may be so employed in conjunction with the hydrogen. However, the use of nitrogen and carbon monoxide, as well as mixtures of the same, in combination with the hydrogen is particularly advantageous from an engineering standpoint. As shown by the data presented in Example II, above, the product gas for the most part comprises hydrogen, nitrogen, and carbon monoxide in addition to unreacted hydrocarbon and the acetylene product. While it is possible to separate all of these components in substantially pure form and thus recover pure hydrogen for re-use in the process, it is much more simple and economical first to separate the acetylene and unreacted hydrocarbon, and then to treat the remaining gas mixture to separate a mixture of hydrogen and nitrogen, or of hydrogen and carbon monoxide, or a mixture of all three, suitable for re-use in the process as the gas which is admixed with the reactant gas in the reaction zone. Accordingly, employing the hydrogen in the form of a mixture with nitrogen or carbon monoxide or both is superior to employing the hydrogen in pure form from the standpoint of simplicity and economy in recovering the hydrogen from the product gas for re-use in the process. Also, additional advantage lies in the fact that somewhat improved yields of acetylene are obtained when the hydrogen is employed in admixture with an inert gas. Such mixture of hydrogen and inert gas may comprise from as little as about 30 up to 100 per cent by volume of hydrogen and, correspondingly, from about 70 down to zero per cent by volume of the inert gas. Regardless of the composition of such mixture, however, the hydrogen should be provided in the amount hereinbefore specified, and the volume of the mixture which must be supplied to the reaction zone will thus increase with decreasing concentration of the hydrogen in such mixture. Also, since the inert gas has a cooling effect within the reaction zone, the use of mixtures containing relatively large proportions of the inert gas requires the use of higher preheat temperatures in order that the necessary reaction temperature be attained in the reaction zone. On the other hand, the cost of separating hydrogen mixtures from the product gas increases with the concentration of the hydrogen in the mixture. Accordingly, the optimum composition of the mixture of hydrogen and inert gas will be determined by balancing the cost of separating the mixture from the product gas against the cost of providing the additional heat which the inert gas requires. Usually, the optimum gas mixture will contain from about 85 to about 95 per cent by volume of hydrogen and from about 5 to about 15 per cent by volume of the inert gas. The operating variables of the process are not materially changed by employing the hydrogen in admixture with an inert gas rather than in pure form.

The following examples illustrate practice of the invention employing the hydrogen in admixture with various other gases, but are not to be construed as limiting the invention.

Example V

Four experiments were carried out as described in Example I except that the hydrogen introduced into the reaction zone was replaced by a hydrogen-nitrogen mixture containing 95 per cent by volume of hydrogen and 5 per cent of nitrogen. The operating conditions were substantially the same as in Example I except that slightly different preheat temperatures were employed. The data obtained are tabulated as follows:

| Experiment | Selected Preheat Temp., °C | Temp., °C, at Points Along Length of Tube 11, Inches from Beginning of Preheating Zone | | | | | | | | Yield of Acetylene,[1] Percent |
|---|---|---|---|---|---|---|---|---|---|---|
| | | 11 | 12 | 14 | 15 | 15.5 | 16 | 17 | 19 | |
| 1 | 925 | 900 | 921 | 934 | 982 | 1,066 | 1,128 | 1,172 | 1,058 | 29.6 |
| 2 | 975 | 952 | 962 | 980 | 1,036 | 1,136 | 1,204 | 1,248 | 1,102 | 45.2 |
| 3 | 1,080 | 1,064 | 1,076 | 1,090 | 1,158 | 1,254 | 1,311 | 1,337 | 1,140 | 52.4 |
| 4 | 1,140 | 1,132 | 1,142 | 1,149 | 1,210 | 1,292 | 1,342 | 1,356 | 1,160 | 48.2 |

[1] Based on amount of natural gas consumed.

These data are presented graphically in Figure 4. It will be noted that the curves of Figure 4 are substantially the same as those of Figure 3, demonstrating that the principle of the invention is not limited to the use of the hydrogen in pure form. It will also be noted from Table 2 that the yield of acetylene increased with increasing preheat and reaction temperatures up to a certain point, after which it decreased to some extent. This is considered to be due in part to the fact that in experiment 4 the reaction temperature was somewhat above the optimum for the particular reactant gas employed. It is also due to the fact that at higher preheat temperatures reaction occurs to an appreciable extent between the natural gas and oxygen within the preheating zone in the absence of the hydrogen-nitrogen mixture. Apparently, during such reaction a substantial amount of the natural gas is converted to products other than acetylene, e. g., carbon dioxide, which results in a lower ultimate yield of acetylene.

Example VI

The effect of varying the composition of the mixture of hydrogen and inert gas upon the yield of acetylene was determined by a set of seven experiments carried out under the following conditions:

Reactant gas:
  Methane_____ 24.6% by vol.
  Air_____ 75.4% by vol.
Inert gas_____ Nitrogen.
Rate of feed, reactant gas__ 8.15 s. c. f./hr.
Rate of feed, hydrogen mixture__ 6.0 s. c. f./hr.
Vol. ratio, hydrogen mixture/reactant gas_____ 0.74/1.
Preheat temperature_____ 1150° C.
Residence time in reaction zone_ 0.008 sec.

Each experiment was carried out as described in Example I. The data obtained are summarized as follows:

| Experiment | Composition of Hydrogen Mixture | | Yield of Acetylene,[1] Percent |
| --- | --- | --- | --- |
| | $H_2$, Percent by Vol. | $N_2$, Percent by Vol. | |
| 1 | 100.0 | 0.0 | 44.1 |
| 2 | 95.0 | 5.0 | 50.8 |
| 3 | 90.0 | 10.0 | 53.4 |
| 4 | 75.0 | 25.0 | 53.4 |
| 5 | 66.6 | 33.3 | 53.2 |
| 6 | 50.0 | 50.0 | 50.0 |
| 7 | 33.3 | 66.6 | 45.6 |

[1] Based on amount of methane consumed.

It will be noted from these data that the use of hydrogen-nitrogen mixtures containing from as little as 1 or less to about 70 per cent by volume of nitrogen and from 99 or more to about 30 per cent by volume of hydrogen gives acetylene yields as good as or better than those obtained when pure hydrogen is employed.

*Example VII*

A set of experiments identical with those of Example VI were carried out employing carbon monoxide instead of nitrogen as the inert gas. In general, the results were the same as those observed in Example VI. The maximum yield of acetylene was obtained when employing a hydrogen-carbon monoxide mixture containing about 65 per cent by volume of hydrogen and about 35 per cent by volume of carbon monoxide.

*Example VIII*

Two experiments were carried out as in Example I under the following conditions:

Reactant gas:
  Natural gas_____ 24.6% by vol.
  Air_____ 75.4% by vol.
Inert gas:
  Hydrogen_____ 85% by vol.
  Nitrogen_____ 7.5% by vol.
  Carbon monoxide_____ 7.5% by vol.
Preheat temperature_____ 1150° C.

In the first experiment the reactant gas was introduced into the reactor at a rate of 15.64 s. c. f./hr. and the hydrogen mixture was introduced at a rate of 10.52 s. c. f./hr. The rate of flow of gas through the reactor was thus about 250 linear ft./sec., and the residence time within the reaction zone was about 0.004 second. The yield of acetylene obtained was 44.8 per cent based on the amount of natural gas consumed, and 27.4 per cent based on the amount of natural gas supplied to the reactor. In the second experiment the rates of feed were adjusted to secure a linear gas velocity through the reactor of about 145 ft./sec., corresponding to a residence time within the reaction zone of about 0.007 second. The yield of acetylene obtained was 49.6 per cent based on the natural gas consumed, and 33.8 per cent based on the natural gas supplied to the reactor.

*Example IX*

Reactant gas:
  Methane_____ 24.6% by vol.
  Air_____ 73.4% by vol.
Hydrogen mixture:
  Hydrogen_____ 95% by vol.
  Nitrogen_____ 2.5% by vol.
  Carbon monoxide_____ 2.5% by vol.
Rate of feed, reactant gas____ 15.64 s. c. f./hr.
Rate of feed, hydrogen mixture__ 10.52 s. c. f./hr.
Preheat temperature_____ 1150° C.
Residence time in preheat zone_ 0.005 second.
Residence time in reaction zone_ 0.004 second.
Volume ratio, hydrogen mixture/reactant gas_____ 0.67/1.

The procedure employed was the same as in the preceding examples. The product gas contained (water-free basis):

| | Per cent by volume |
| --- | --- |
| Acetylene | 2.6 |
| Methane | 6.9 |
| Ethylene | 0.2 |
| Carbon monoxide | 5.2 |
| Carbon dioxide | 0.3 |
| Oxygen | 0.1 |
| Nitrogen | 40.2 |
| Hydrogen | 44.5 |
| | 100.0 |

Material balances were as follows:

| | Per cent |
| --- | --- |
| Methane converted to acetylene | 30.8 |
| Methane converted to carbon monoxide | 23.7 |
| Methane converted to other products | 4.7 |
| Methane unconverted | 40.8 |
| Yield of acetylene, based on methane supplied | 30.8 |
| Yield of acetylene, based on methane consumed | 52.0 |
| Yield of carbon monoxide, based on methane supplied | 23.7 |
| Yield of hydrogen, based on methane supplied | 11.0 |

As will be apparent to those skilled in the art, many variations with respect to the different operating variables, reactor design, etc., are possible within the herein defined scope of the invention, and various techniques may be applied to the practice of the invention on a large scale. Thus, for example, it may be desired to effect part of the preheating of the reactant gas and/or hydrogen mixtures by indirect heat exchange against the hot product gas. Similarly, various forms of heaters and different types of fuel may be employed for preheating, and the reactor may take various forms adapted to conserve heat as much as possible. Various refractory materials may be employed in its construction. Likewise, the product gas may be treated in various known ways to separate the different constituents thereof. The acetylene may be separated by adsorption on a solid adsorbent, by selective solvent extraction, or by a selective chemical reaction such as adsorption in aqueous solutions of certain metal salts. The unreacted hydrocarbon may be recovered for re-use in the process by selective adsorption on activated charcoal employing the known "Hypersorption" process, which process may also be adapted simultaneously to produce a mixture of hydrogen and nitrogen or carbon monoxide suitable for re-use in the process. Also the reactant gas constituents may be obtained from various sources, and the reactant gas may be prepared in various ways. Thus, a suitable reactant gas mixture may be obtained according to the process described and claimed in my copending application, Serial No. 125,663 filed November 4, 1949, whereby a hydrocarbon gas is contacted with barium peroxide at an elevated temperature to obtain a gas mixture comprising the hydrocarbon and oxygen, and the barium oxide produced by such treatment is subsequently contacted with air at an elevated temperature to regenerate the peroxide for re-use in the process.

As previously stated, by including ammonia as an essential component of the reactant gas the acetylene product may be obtained in admixture with hydrogen cyanide. It is known that hydrogen cyanide may be obtained by reacting ammonia and oxygen or air with a low molecular weight saturated hydrocarbon, such as methane or natural gas, at high temperatures over short periods of time. The reaction which takes place may be represented by the equation:

(1) 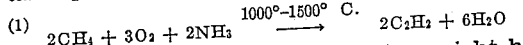

The reaction between low molecular weight hydrocarbons, such as methane or natural gas, and oxygen or air to produce acetylene takes place under substantially the same conditions, and may be represented by the equation:

(2) 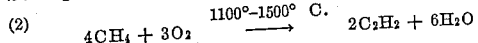

Recently it has been found that gaseous mixtures of hydrogen cyanide and acetylene undergo reaction in the presence of certain catalysts to form acrylonitrile, which finds important industrial use in the manufacture of certain types of synthetic rubber and other polymeric compositions. In view of the fact that substantially the same conditions of time and temperature are employed when producing hydrogen cyanide and acetylene according to the above Equations 1 and 2, respectively, it would appear that a mixture of hydrogen cyanide and acetylene suitable for use directly in the production of acrylonitrile could be produced by a single reaction which may be represented by an equation which is the arithmetical sum of Equations 1 and 2:

(3) 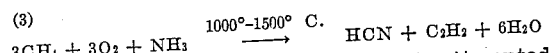

I have found, however, that when it is attempted to produce a mixture of hydrogen cyanide and acetylene by reaction according to this equation, only small quantities of the desired products are obtained and the reactants are either recovered unreacted or are converted to other products. Thus, when a mixture consisting of 1.07 s. c. f. of methane, 3.94 s. c. f. of air, and 0.7 s. c. f. of ammonia is subjected to a temperature of about 1200° C. for about 0.026 second substantially all of the ammonia is recovered as such and a large proportion of the methane is converted to carbon monoxide. The yields of hydrogen cyanide and acetylene, based on the methane employed, are only about 5.9 and about 13.8 per cent, respectively.

I have found that highly improved yields of acetylene and hydrogen cyanide may be obtained by carrying out the reaction in the presence of added hydrogen as previously described, i. e., by preheating a reactant gas mixture comprising the hydrocarbon, oxygen or air, and ammonia, adding hydrogen or a mixture of hydrogen and an inert gas to the preheated reactant gas to induce or initiate reaction, and thereafter quenching the product gas within a very short time after its formation. With the exception of the reactant gas composition, the various operating conditions and techniques employed are identical with those set forth above.

When operating the process to produce the acetylene in admixture with hydrogen cyanide, the proportions in which the reactants are employed may be varied between rather wide limits. According to Equation 3 above, the reaction requires three moles each of methane and oxygen per mole of ammonia. However, the reactant gas mixture may be made up to contain from about ½ to about three times the amount of ammonia required by theory. When methane or natural gas is employed as the hydrocarbon reactant, from about ⅛ to about 1, preferably about ½, mole of ammonia is usually provided per mole of the hydrocarbon. The proportion of oxygen provided in the reactant gas mixture may likewise be varied over a considerable range, and it is possible to exercise some control over the relative yields of hydrogen cyanide and acetylene by varying the proportion of oxygen in the feed gas. In general, the formation of hydrogen cyanide is favored at the expense of the acetylene when the proportion of oxygen provided in the feed gas is greater than that required by theory. Conversely, the yield of acetylene may be increased at the expense of the hydrogen cyanide by employing less oxygen than is required by theory. Ordinarily, however, it is desired to produce the hydrogen cyanide and acetylene in substantially equimolecular quantities, and accordingly substantially the theoretical amount of oxygen is usually employed. When methane or natural gas is employed as the hydrocarbon reactant, substantially equimolecular amounts of the hydrocarbon and oxygen are employed, although if desired from as little as ½ to as much as 2 moles of oxygen may be employed per mole of the hydrocarbon. When the hydrocarbon reactant is one of relatively high molecular weight, e. g., a petroleum distillate such as kerosene, as many as 50 moles of oxygen may be provided per mole of hydrocarbon. When the oxygen reactant is provided in the form of air, suitable allowance should be made for the nitrogen content of the air. Thus, a suitable feed gas comprising methane or natural gas, air and ammonia may consist of from about 5 to about 65 per cent by volume of methane or natural gas, from about 65 to about 85 per cent by volume of air, and from about 5 to about 10 per cent by volume of ammonia.

The following examples illustrate the simultaneous production of acetylene and hydrogen cyanide according to the process of the invention, but are not to be construed as limiting the same.

*Example X*

The apparatus was constructed substantially as shown in Figure 1, tubes 11 and 16 having inside diameters of ¼ and ⅛ inch, respectively. Heating was accomplished by two "Glo-Bar" silicon carbide heating elements 8½ inches long. The feed gas, consisting of 100 molecular equivalents of methane, 92.3 molecular equivalents of oxygen in the form of air, and 50.0 molecular equivalents of ammonia was introduced into the feed gas inlet at a rate of 7.95 s. c. f. h., and the hydrogen was introduced into the hydrogen inlet at a rate of 3.90 s. c. f. h. The mole ratio of hydrogen to methane was about 3/1. The product gas withdrawn from the reaction zone was shock-cooled, passed through a cold trap, and thence to a conventional gas sampling system. A series of six runs was made under these conditions, the length of the preheating zone (and hence the preheat temperature) being varied by sliding the feed gas inlet tube in or out of the stopper. The data obtained are tabulated as follows:

| Run No. | Point of Hydrogen Addition, Inches [1] | Approximate Preheat Temperature, °C. | Hydrogen Cyanide Yield, Percent [2] | Acetylene Yield, Percent [3] |
|---|---|---|---|---|
| 1 | 0.0 | 300 | | |
| 2 | 2.0 | 450 | 14.0 | 16.2 |
| 3 | 4.0 | 750 | 19.9 | 18.2 |
| 4 | 6.0 | 975 | 26.6 | 25.6 |
| 5 | 8.0 | 1,100 | 32.5 | 26.2 |
| 6 | 10.0 | 1,200 | 31.9 | 28.4 |
| | | | 0.6 | 0.0 |

[1] Distance in inches from beginning of heating section.
[2] Based on the amount of ammonia employed.
[3] Based on the amount of methane employed.

The curves shown in Figure 5 of the accompanying drawing are plotted from the above data, and illustrate the relationship between the yields of hydrogen cyanide and acetylene and the preheat temperature, i. e., the temperature of the reactant gas at the time of hydrogen addition. It will be noted that in run No. 6, wherein the preheat temperature was so high that reaction occurred prior to introduction of the hydrogen, substantially no hydrogen cyanide or acetylene was obtained.

Example XI

The apparatus and procedure employed were the same as that described above in Example I. The operating conditions were as follows:

Feed gas:
- Methane _____ 15.4% by vol.
- Air _____ 77.0% by vol.
- Ammonia _____ 7.6% by vol.
- Rate of feed _____ 8.45 s. c. f./hr.
- Rate of hydrogen addition ____ 3.90 s. c. f./hr.
- Mole ratio, oxygen to methane _ 1/1.
- Mole ratio, hydrogen to methane _ 3/1.
- Average reaction temperature __ 1200° C.
- Preheat temperature _____ 950° sec.
- Reaction time _____ 0.003 sec.

The composition of the product gas on a water-free basis was as follows:

| | Per cent by volume |
|---|---|
| Nitrogen | 49.4 |
| Hydrogen | 37.1 |
| Methane | 2.2 |
| Ammonia | 3.1 |
| Carbon dioxide | 0.2 |
| Carbon monoxide | 3.5 |
| Ethylene | 0.4 |
| Hydrogen cyanide | 2.3 |
| Acetylene | 1.8 |
| Total | 100.0 |

The yield of hydrogen cyanide was 38.7 per cent, based on ammonia employed, and 79.6 per cent, based on the ammonia consumed. The yield of acetylene was 28.8 per cent, based on the methane employed, and 35.0 per cent, based on the methane consumed. The net consumption of the added hydrogen was substantially zero.

Example XII

The procedure and operating conditions employed were the same as in Example XI, except that the hydrogen introduced into the reaction zone was replaced by a hydrogen-nitrogen mixture containing 80 per cent by volume of hydrogen and 5 per cent by volume of nitrogen. The yield of hydrogen cyanide was about 72 per cent, based on the ammonia consumed, and the yield of acetylene was about 34 per cent, based on the methane consumed. Substantially identical results were obtained when the nitrogen in the hydrogen-containing gas was replaced with carbon monoxide or with a mixture of nitrogen and carbon monoxide.

Other modes of applying the principle of my invention may be employed instead of those explained, change being made as regards the materials and apparatus employed, provided the step or steps stated by any of the following claims, or the equivalent of such stated step or steps, be employed.

This application is a continuation-in-part of my copending applications Serial No. 173,132, filed August 7, 1950, and Serial No. 149,411 filed March 13, 1950, now abandoned.

I, therefore, particularly point out and distinctly claim as my invention:

1. The process for producing an acetylene-containing product gas which comprises (1) forming a reactant gas comprising oxygen and a non-aromatic hydrocarbon having a normal boiling point below about 400° C.; (2) preheating said reactant gas to a temperature below that at which reaction between the components thereof takes place to any substantial extent; (3) initiating an acetylene-producing reaction by introducing into the preheated reactant gas a hydrogen-containing gas comprising from about 20 to 100 per cent by volume of molecular hydrogen substantially free from atomic hydrogen and from about 70 to zero per cent by volume of a diluent gas which is inert under the conditions of said acetylene-producing reaction, the amount of said hydrogen-containing gas being sufficient to provide between about 0.5 and about 5 moles of hydrogen per mole of hydrocarbon in the reactant gas; (4) controlling the temperature of said preheated reactant gas and said hydrogen-containing gas so that the temperature attained in said acetylene-producing reaction is between about 1100° C. and about 1500° C.; and (5) within from about 0.001 to about 0.05 second after introduction of the said hydrogen-containing gas into the said preheated reactant gas, cooling the product gas to a temperature at which substantially no further reaction occurs.

2. The process for producing acetylene which comprises (1) forming a reactant gas consisting essentially of oxygen and a non-aromatic hydrocarbon having a normal boiling point below about 400° C.; (2) preheating said reactant gas to a temperature below that at which reaction between the components thereof takes place to any substantial extent; (3) initiating an acetylene-producing reaction by introducing into the preheated reactant gas a hydrogen-containing gas comprising from about 30 to 100 per cent by volume of molecular hydrogen substantially free from atomic hydrogen and from about 70 to zero per cent by volume of a diluent gas which is inert under the conditions of said acetylene-producing reaction, the amount of said hydrogen-containing gas being sufficient to provide between about 0.5 and about 5 moles of hydrogen per mole of hydrocarbon in the reactant gas; (4) controlling the temperature of said preheated reactant gas and said hydrogen-containing gas so that the temperature attained in said acetylene-producing reaction is between about 1100° C. and about 1500° C.; and (5) within from about 0.001 to about 0.05 second after introduction of the said hydrogen-containing gas into said preheated reactant gas, cooling the product gas to a temperature at which substantially no further reaction occurs.

3. The process of claim 2 wherein the hydrocarbon component of the reactant gas is a normally gaseous saturated aliphatic hydrocarbon.

4. The process of claim 2 wherein the hydrocarbon reactant is selected from the class consisting of methane and natural gas.

5. The process of claim 2 wherein the reactant gas comprises between about 17 and about 30 per cent by volume of a hydrocarbon selected from the class consisting of methane and natural gas and between about 83 and about 70 per cent by volume of air.

6. The process of claim 2 wherein the diluent gas is selected from the class consisting of nitrogen, carbon monoxide and mixtures of carbon monoxide and nitrogen.

7. The process for producing acetylene which comprises (1) forming a reactant gas essentially comprising oxygen and a normally gaseous saturated aliphatic hydrocarbon; (2) passing said reactant gas through a first preheating zone wherein it is heated to a temperature below that at which reaction between the components thereof takes place to any substantial extent; (3) passing a hydrogen-containing gas comprising from about 30 to 100 per cent by volume of molecular hydrogen and from about 70 to zero per cent by volume of a diluent gas which is inert under the conditions of the subsequent acetylene-producing reaction through a second preheating zone wherein said hydrogen-containing gas is preheated to a temperature below that at which any substantial amount of atomic hydrogen is formed; (4) initiating an acetylene-producing reaction by simultaneously introducing the preheated hydrogen-containing gas and the preheated reactant gas into a reaction zone, the amount of the hydrogen-containing gas so introduced being sufficient to provide between about 0.5 and about 5 moles of hydrogen per mole of hydrocarbon in the reactant gas which is introduced into said zone; (5) controlling the preheat temperatures so that the temperature attained in said acetylene-producing reaction is between about 1100° C. and about 1500° C.; and (6) within from about 0.001 to about 0.05 second after introduction of the preheated hydrogen-containing gas and the preheated reactant gas into said reaction zone, withdrawing the product gas from the reaction zone and cooling it to a temperature at which substantially no further reaction occurs.

8. The process of claim 7 wherein the hydrocarbon reactant is selected from the class consisting of methane and natural gas.

9. The process of claim 7 wherein the reactant gas comprises between about 17 and about 30 per cent by volume of a hydrocarbon selected from the class consisting of methane and natural gas and between about 83 and about 70 per cent by volume of air.

10. The process of claim 7 wherein the hydrogen-containing gas and the reactant gas are preheated to a temperature between about 600° C. and about 1150° C. prior to their introduction into the reaction zone.

11. The process of claim 7 wherein the diluent gas is selected from the class consisting of nitrogen, carbon monoxide and mixtures of nitrogen and carbon monoxide.

12. The process of claim 7 wherein the hydrogen-containing gas comprises between about 85 and about 95 per cent by volume of molecular hydrogen and between about 15 and about 5 per cent by volume of diluent gas selected from the class consisting of nitrogen, carbon monoxide and mixtures of nitrogen and carbon monoxide.

13. The process of claim 7 wherein the amount of the hydrogen-containing gas introduced into the reaction zone is sufficient to provide between about 1.5 and about 3 moles of hydrogen per mole of hydrocarbon reactant.

14. The process for producing acetylene which comprises (1) forming a reactant gas comprising between about 17 and about 30 per cent by volume of natural gas and between about 83 and about 70 per cent by volume of air; (2) passing said reactant gas through a first preheating zone wherein said gas is heated to a temperature between about 950° C. and about 1150° C.; (3) passing a hydrogen-containing gas comprising between about 85 and about 95 per cent by volume of hydrogen and between about 15 and about 5 per cent by volume of an inert gas selected from the class consisting of nitrogen, carbon monoxide and mixtures thereof through a second preheating zone maintained at substantially the same temperature as said first preheating zone; (4) initiating an acetylene-producing reaction within a reaction zone by simultaneously passing into said reaction zone preheated reactant gas from said first preheating zone and preheated hydrogen-containing gas from said second preheating zone, the amount of preheated hydrogen-containing gas being sufficient to provide within the reaction zone between about 1.5 and about 3 moles of hydrogen per mole of hydrocarbon; and (5) within from about 0.002 to about 0.02 second after the introduction of the preheated reactant gas and the preheated hydrogen-containing gas into the reaction zone, withdrawing an acetylene-containing product gas from the reaction zone and cooling it to a temperature below about 650° C.

15. The process for producing hydrogen cyanide and acetylene which comprises (1) forming a reactant gas essentially comprising a non-aromatic hydrocarbon having a normal boiling point below about 400° C., oxygen and ammonia, said reactant gas containing from about ½ to about 3 times the amount of ammonia and from about ½ to about 2 times the amount of oxygen theoretically required for the formation of hydrogen cyanide and acetylene; (2) passing said reactant gas through a first preheating zone; (3) passing a hydrogen-containing gas comprising between about 30 and 100 per cent by volume of molecular hydrogen and between about 70 and zero per cent by volume of a diluent gas which is inert under the condition of the subsequent acetylene- and hydrogen cyanide-producing reaction through a second preheating zone wherein the hydrogen-containing gas is preheated to a temperature below that at which any substantial amount of atomic hydrogen is formed; (4) initiating an acetylene- and hydrogen cyanide-producing reaction by simultaneously introducing the preheated hydrogen-containing gas and the preheated reactant gas into a reaction zone, the amount of hydrogen-containing gas so introduced being sufficient to provide between about 0.5 and about 5 moles of hydrogen per mole of hydrocarbon in the reactant gas which is introduced into said zone; (5) controlling the preheat temperatures so that the temperature attained in said acetylene- and hydrogen cyanide-producing reaction is between about 1100° C. and about 1500° C.; and (6) within from about 0.001 to about 0.05 second after introduction of the preheated hydrogen-containing gas and preheated reactant gas into said reaction zone, withdrawing the product gas from the reaction zone and cooling it to a temperature below that at which substantially no further reaction occurs.

16. The process of claim 15 wherein the hydrocarbon reactant is selected from the class consisting of methane and natural gas.

17. The process of claim 15 wherein the reactant gas comprises between about 5 to about 65 per cent by volume of a hydrocarbon selected from the class consisting of methane and natural gas, from about 65 to about 85 per cent by volume of air, and from about 5 to about 10 per cent by volume of ammonia.

18. The process of claim 15 wherein the hydrogen-containing gas comprises between about 85 and about 95 per cent by volume of molecular hydrogen and between about 15 and about 5 per cent by volume of a diluent gas selected from the class consisting of nitrogen, carbon monoxide and mixtures of nitrogen and carbon monoxide.

19. The process of claim 15 wherein the reactant gas and the hydrogen-containing gas are preheated to a temperature between about 600° C. and about 1150° C. prior to their introduction into the reaction zone.

20. The process of claim 15 wherein the amount of hydrogen-containing gas introduced into the reaction zone is sufficient to provide between about 1.5 and about 3 moles of hydrogen per mole of hydrocarbon reactant.

21. A process for producing hydrogen cyanide and acetylene which comprises (1) forming a reactant gas essentially comprising oxygen, ammonia, and a hydrocarbon selected from the class consisting of methane and natural gas, said reactant gas containing from about ½ to about 3 times the amount of ammonia and from about ½ to about 2 times the amount of oxygen theoretically required for the formation of hydrogen cyanide and acetylene; (2) preheating said reactant gas to a temperature between about 950° C. and about 1150° C.; (3) preheating a hydrogen-containing gas comprising between 30 and 100 per cent by volume of molecular hydrogen and between about 70 and zero per cent by volume of a diluent gas selected from the class consisting of nitrogen, carbon monoxide and mixtures of nitrogen and carbon monoxide to a temperature between about 950° C. and about 1150° C.; (4) initiating an acetylene- and hydrogen cyanide-producing reaction by simultaneously introducing the preheated hydrogen-containing gas and the preheated reactant gas into a reaction zone, the amount of hydrogen-containing gas so introduced being sufficient to provide between about 1.5 and about 3 moles of hydrogen per mole of hydrocarbon in the reactant gas which is introduced into said zone; and (5) within from about 0.002 to about 0.2 second after the introduction of the preheated reactant gas and the preheated hydrogen-containing gas into the reaction zone, withdrawing an acetylene- and hydrogen cyanide-containing product gas from the reaction zone and cooling it to a temperature below about 650° C.

References Cited in the file of this patent

UNITED STATES PATENTS

| Number | Name | Date |
|---|---|---|
| 2,167,471 | Auerbach | July 25, 1939 |
| 2,370,849 | Dutcher | Mar. 6, 1945 |
| 2,549,240 | Robinson | Apr. 17, 1951 |

FOREIGN PATENTS

| Number | Country | Date |
|---|---|---|
| 332,731 | Great Britain | July 31, 1930 |
| 479,438 | Great Britain | Feb. 4, 1938 |